United States Patent [19]

Westgaard et al.

[11] Patent Number: 4,616,296

[45] Date of Patent: Oct. 7, 1986

[54] LAMP

[75] Inventors: Donald J. Westgaard, Bloomingdale; Scott L. Roos, Skokie, both of Ill.

[73] Assignee: Alkco Manufacturing Company, Franklin Park, Ill.

[21] Appl. No.: 763,342

[22] Filed: Aug. 7, 1985

[51] Int. Cl.[4] .............................................. A01G 13/00

[52] U.S. Cl. ...................................... 362/33; 362/301; 362/300

[58] Field of Search .................. 362/33, 340, 301, 300

[56] References Cited

U.S. PATENT DOCUMENTS

| | | | |
|---|---|---|---|
| 3,832,539 | 8/1974 | Oram | 362/301 |
| 4,200,902 | 4/1980 | Intrator | 362/301 |
| 4,300,185 | 11/1981 | Wakamatsu | 362/33 |
| 4,414,609 | 11/1983 | Shemitz | 362/33 |

*Primary Examiner*—E. Rollins Cross

*Attorney, Agent, or Firm*—Pasquale A. Razzano

[57] ABSTRACT

A task lamp is disclosed which includes a reflector assembly and two sockets for receiving light bulbs mounted in a housing. The reflector assembly has a planar reflecting surface, front and back reflecting surfaces, and side reflecting surfaces. The planar reflecting surface serves as a base, and the front, back, and side reflecting surfaces extend from the planar reflecting surface and have predetermined angles with respect to a vertical plane when the lamp is in its normal operating position. The reflector assembly also has a pyramidal reflecting piece with triangular reflecting surfaces that extend from the planar reflecting surface. The base of the pyramidal reflecting piece is positioned against one of the front and back reflecting surfaces, while the vertex of the pyramidal reflecting piece is positioned proximate the other of the front and back reflecting surfaces. The reflector assembly and the sockets are arranged to position the pyramidal reflecting piece between the sockets and to position each socket near a side reflecting surface. The lamp advantageously includes slidably mounted lenses, for example, lateral distribution lenses. Moreover, the lamp preferably has shield-reflectors located between inserted light bulbs and the workstation. A white finish on the reflecting surfaces of the reflector assembly is desirable.

14 Claims, 13 Drawing Figures

LAMP

BACKGROUND OF THE INVENTION

The present invention relates, in general, to lighting devices. More particularly, the present invention pertains to an improved lamp, having a pyramidal reflecting piece, that reduces glare and provides a high quality of illumination.

Illumination systems for lighting a workstation are known. Such systems are typically referred to as task lights or task lamps. U.S. Pat. No. 4,414,609 to Shemitz, for example, discloses a previously proposed task lamp.

Generally, task lighting should have the qualities, or produce the effects, listed below:

(a) uniformly illuminate the worksurface;

(b) reduce glare, both on the worksurface and in a user's eyes;

(c) permit the light level to be adjusted to correspond to the task being performed by the particular user;

(d) maximize seeability and comfort;

(e) minimize eyestrain, fatigue, headaches, etc.; and (f) minimize veiling reflections and shadows. However, designing a task lamp that has the qualities and produces the effects listed above is difficult. In practice, many design trade-offs must be made in order to manufacture an acceptable product. Moreover, designing a task lamp with these characteristics that is also simply and easily fabricated, and therefore inexpensive, is very difficult.

Accordingly, a need exists for an inexpensive task lamp that has the features identified above.

SUMMARY OF THE INVENTION

The present invention satisfies the need for an inexpensive task lamp with the features specified above. The present invention overcomes the disadvantages associated with conventional task lamps by providing an improved lamp that includes a reflector assembly, two sockets for receiving light bulbs, and a housing. The reflector assembly and the sockets are mounted in the housing. The reflector assembly has a planar reflecting surface, front and back reflecting surfaces, and side reflecting surfaces running between the front and back reflecting surfaces. The front, back, and side reflecting surfaces extend from the planar reflecting surface. Furthermore, the front, back, and side reflecting surfaces have predetermined angles with respect to a vertical plane when the lamp is in its normal operating position. The reflector assembly also has a pyramidal reflecting piece that extends from the planar reflecting surface. The base of the pyramidal reflecting piece is positioned against one of the front and back reflecting surfaces, and the vertex of the pyramidal reflecting piece is positioned proximate the other of the front and back reflecting surfaces. The reflector assembly and the sockets are arranged so that the pyramidal reflecting piece is located between the sockets. In addition, one of the sockets is mounted to position an inserted light bulb proximate one of the side walls. Similarly, the other of the sockets is mounted to position an inserted light bulb proximate the other of the side walls.

A lamp according to the present invention advantageously includes two lenses that are slidably mounted in the housing. The lenses may be moved between a plurality of positions; a distinct level of light is associated with each position. Thus, the light level at the workstation may be adjusted by the user to a level that is appropriate for the work being done.

Preferably, a lamp according to the present invention has two shield-reflectors, and the predetermined angles of the front, back, and side reflecting surfaces with respect to the vertical plane are all approximately 30°. Each shield-reflector is located near a side reflecting surface but offset from the side reflecting surface. Furthermore, each shield reflector is arranged so that when a light bulb is inserted in the associated socket, the light bulb is located between the shield-reflector and the planar reflecting surface, and the shield-reflector, therefore, is located between the light bulb and the worksurface. Consequently, the shield-reflectors aid in reducing glare, veiling reflections, and shadows. Also, since the shield-reflectors are offset from the side-reflecting surfaces, light from the light bulbs may pass beyond the sides of the housing and satisfactorily illuminate the workstation in this area. Shield-reflectors that are V shaped may advantageously be employed. The mounting configuration for the lenses may permit a lens to slide under the associated shield-reflector or cause a lens to abut the associated shield-reflector when the lens is moved to its outermost position.

The planar reflecting surface and the front, back, and side reflecting surfaces may be finished in white. Moreover, the shield-reflectors may be specular reflectors or they too may be finished in white. In addition, the pyramidal reflecting piece may include a plurality of triangular reflecting surfaces, which preferably have the same finish as the front, back, and side reflecting surfaces.

The sockets may desirably receive light bulbs with a generally oval outline. Each socket may then be arranged to align the major axis of the oval with the associated side reflecting surface. That is, each socket may be tilted to cause the major axis of the oval to be substantially parallel to the associated side reflecting surface.

A lamp according to the present invention may have a mounting bracket. The front portion of the mounting bracket defines a groove, while the back portion of the mounting bracket defines a channel. At least one spring is mounted in the channel of the mounting bracket. The lamp housing has an extending flange on the top and a channel in the back; the channel of the housing defines a shoulder. When the housing is installed in the mounting bracket, the flange and the shoulder of the housing extend into the groove and the channel, respectively, of the mounting bracket, while the spring or springs engage the shoulder and urge the housing toward the front portion of the mounting bracket. This spring-load lamp mounting configuration enables the housing to quickly and easily be inserted into and removed from the mounting bracket.

BRIEF DESCRIPTION OF THE DRAWINGS

The above and other objects, features, and advantages of the present invention will become apparent upon consideration of the following detailed description of illustrative embodiments thereof, especially when taken in conjunction with the accompanying drawings, wherein.

DETAILED DESCRIPTION OF THE PREFERRED EMBODIMENTS

Figure 1:
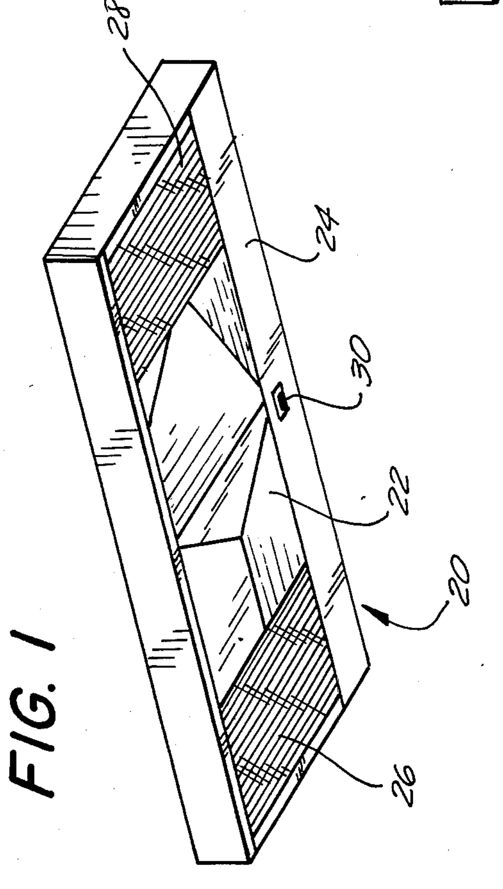
FIG. 1 is a perspective view of a lamp according to the present invention and shows the lenses in one position.
Figure 2:
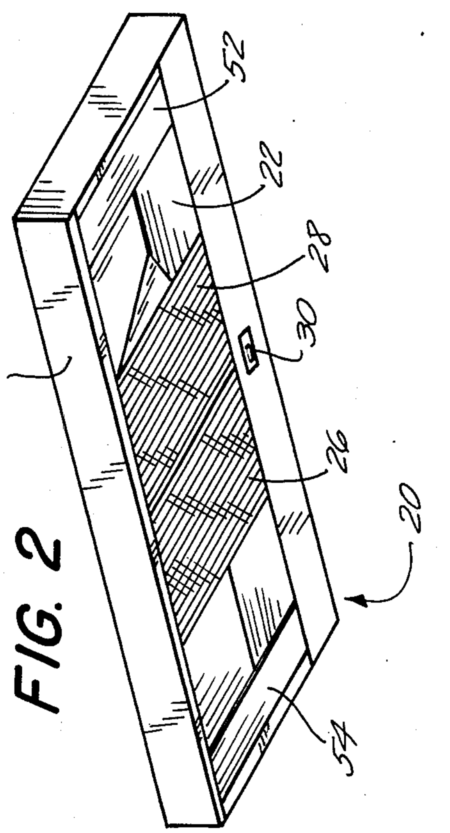
FIG. 2 is a perspective view of a lamp according to the present invention, similar to FIG. 1, but shows the lenses in a different position.

Referring now to the drawings, and specifically to FIGS. 1 and 2, a lamp 20 according to the invention is shown which includes a reflector assembly 22 and a housing 24. Reflector assembly 22 is depicted in greater detail in FIG. 3.

Lamp 20 also includes lenses 26 and 28, which are slidably mounted in housing 24, and an on/off switch 30. Lateral distribution lenses are advantageously employed in a lamp according to the invention.

Figure 6:
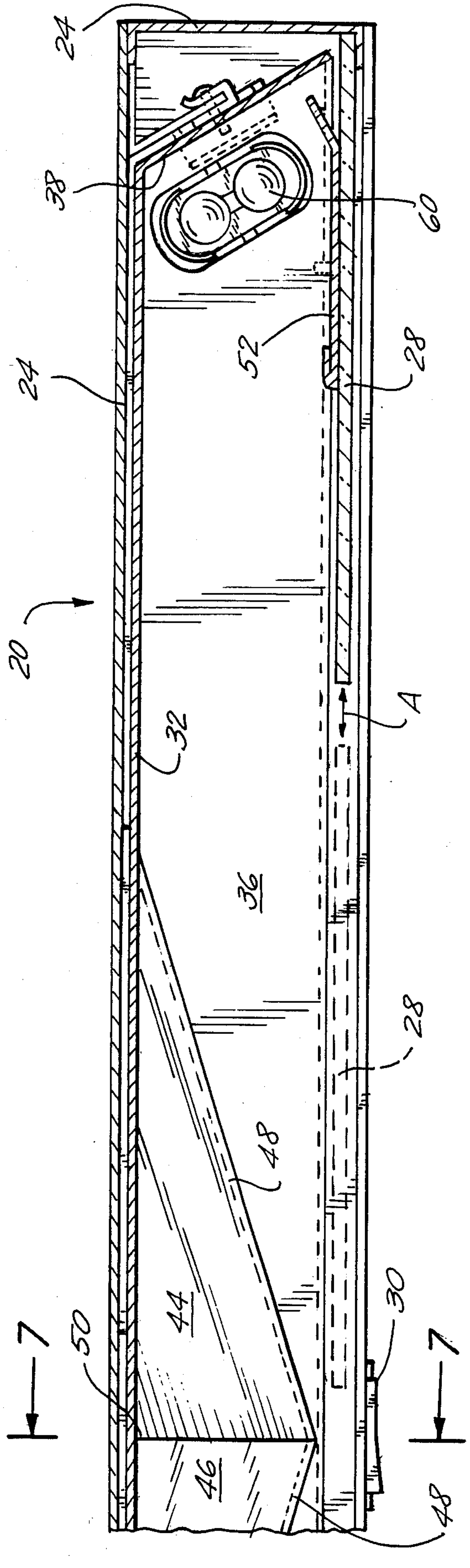
FIG. 6 is an enlarged, fragmentary sectional view of a lamp according to the present invention taken along line 6—6 of FIG. 4.

As seen in FIGS. 1 and 2, lenses 26 and 28 are mounted for movement between an outer position (FIG. 1) and an inner or centered position (FIG. 2). The lenses 26, 28 are be mounted to allow them to stop in any position between those shown in FIGS. 1 and 2, so that they have continuously variable positions. Alternatively, lenses 26, 28 may be mounted to have only a finite number of operational positions, for example, three. Detents (not shown) may hold the lenses 26, 28 in these discrete positions. A distinct light level is associated with each of the positions. The direction of movement of lens 28 is denoted by the arrow A in FIG. 6.

Due to the ability of lenses 26, 28 to assume a number of operational positions, the light provided by the lamp may be varied until it is satisfactory for the particular job or the particular user. For instance, more light may be necessary for jobs involving close, detailed work, or for older users. Accordingly, lenses 26, 28 may be adjusted to provide a sufficient amount of light. The position of lenses 26, 28 shown in FIG. 1 is satisfactory for most tasks. However, if more light is desired, lenses 26, 28 may be moved toward the center of the lamp 20. The position of lenses 26, 28 shown in FIG. 2 provides the maximum amount of light.

Figure 3:
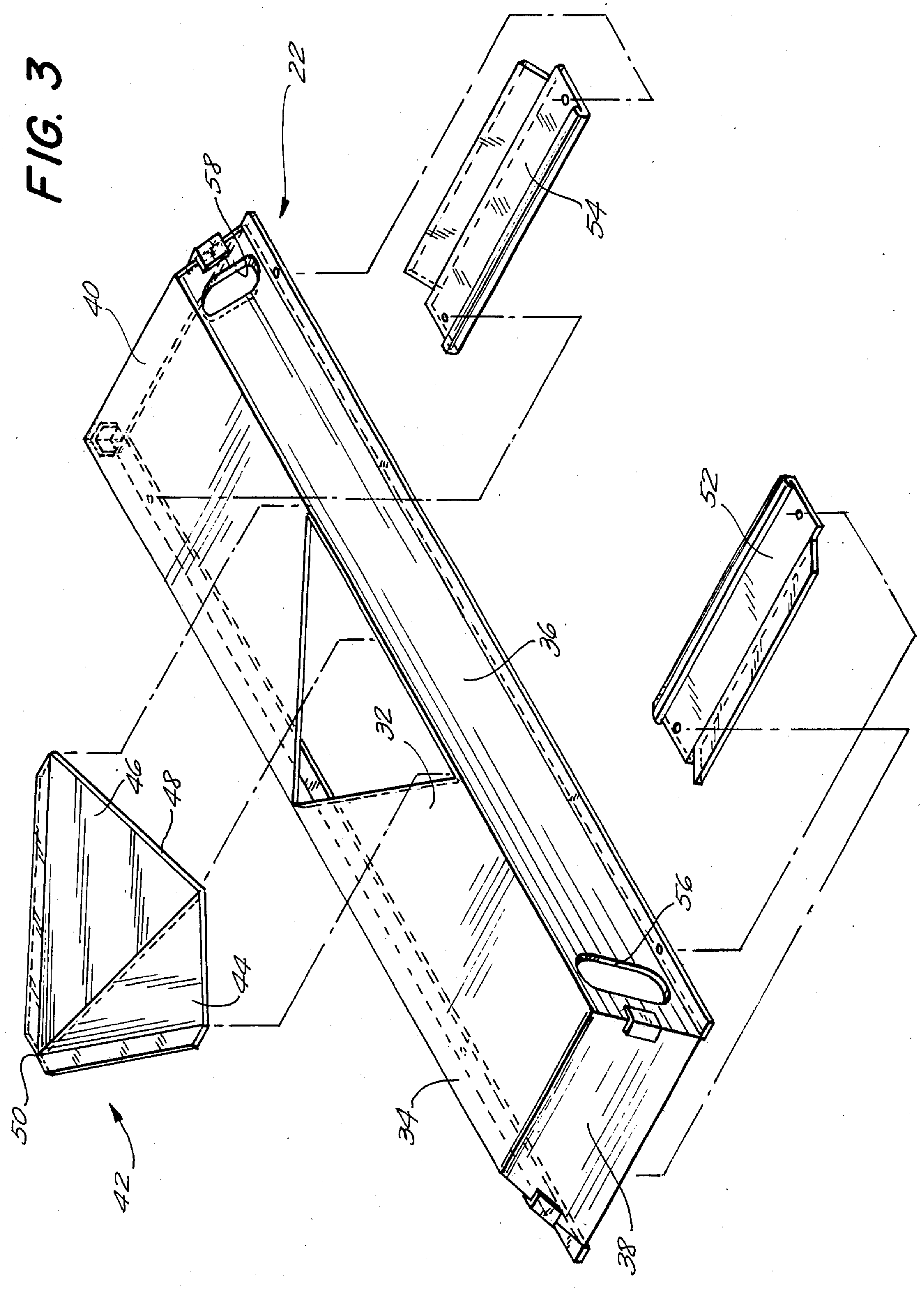
FIG. 3 is an exploded isometric view of a reflector assembly for a lamp according to the present invention.

As seen in FIG. 3 reflector assembly 22 has a planar reflecting surface 32, a front reflecting surface 34, a back reflecting surface 36, and side reflecting surfaces 38 and 40. Reflector assembly 22 also has a pyramidal reflecting piece 42, with triangular reflecting surfaces 44 and 46. Pyramidal reflecting piece 42 is located centrally in reflector assembly 22, i.e., between side reflecting surfaces 38 and 40, and has a base 48 positioned against back reflecting surface 36, with a vertex 50 proximate front reflecting surface 34. In the embodiment of the invention shown in FIG. 3, vertex 50 is located at the line defined by the intersection of planar reflecting surface 32 and front reflecting surface 34.

Planar reflecting surface 32 acts as a base, and front reflecting surface 34, back reflecting surface 36, and side reflecting surfaces 38 and 40 extend from planar reflecting surface 32, as does pyramidal reflecting piece 42. Front reflecting surface 34, back reflecting surface 36, and side reflecting surfaces 36 and 38 have predetermined angles with respect to a vertical plane when lamp 20 is in its normal operating position, namely, when planar reflecting surface 32 is parallel to a horizontal plane. In other words, the front, back, and side reflecting surfaces are sloped.

Preferably, the front, back, and side reflecting surfaces each have an angle of approximately 30° with respect to a vertical plane when lamp 20 is in its normal operating horizontal position. The angular displacement of the front, back, and side reflecting surfaces from a vertical plane enables light to emanate beyond the sides of housing 24 and uniformly illuminate both a horizontal worksurface and any adjacent vertical partitions. Consequently, the user does not have to readjust his or her eyes when alternately looking between a lighted worksurface and a darkened surrounding partition. Accordingly, seeability and user comfort are increased, and user eyestrain, fatigue, and headaches are decreased.

Reflector assembly 22 also includes shield-reflectors 52 and 54. Shield-reflector 52 is positioned near side reflecting surface 38, while shield-reflector 54 is positioned near side reflecting surface 40, with each shield-reflector being positioned on a line between its associated light bulb and the worksurface. Accordingly, the light bulbs are concealed by the shield-reflectors, and the shield-reflectors prevent lamp image glare on the worksurface. Shield-reflectors 52 and 54 are offset from side reflecting surfaces 38 and 40, respectively, thereby defining slots between the shield-reflectors and the side reflecting surfaces. These slots or spaces, together with the sloped side reflecting surfaces and the lateral distribution lenses, enable light to pass beyond the sides of the housing and illuminate the sides of the workstation, thus minimizing glare, veiling reflections, and shadows. Such a configuration enables the workstation to be lighted from the sides, which results in a high quality of illumination.

Reflector assembly 22 has holes 56 and 58 formed therein through which light bulbs may extend into the interior of reflector assembly from sockets mounted in housing 24. FIGS. 4, 6, 7, 9, and 10 better illustrate the mounting arrangement for the light bulbs and sockets. (As used in this specification and the claims, the term "light bulb" includes incandescent bulbs and lamps as well as fluorescent bulbs and lamps.)

Figure 4:
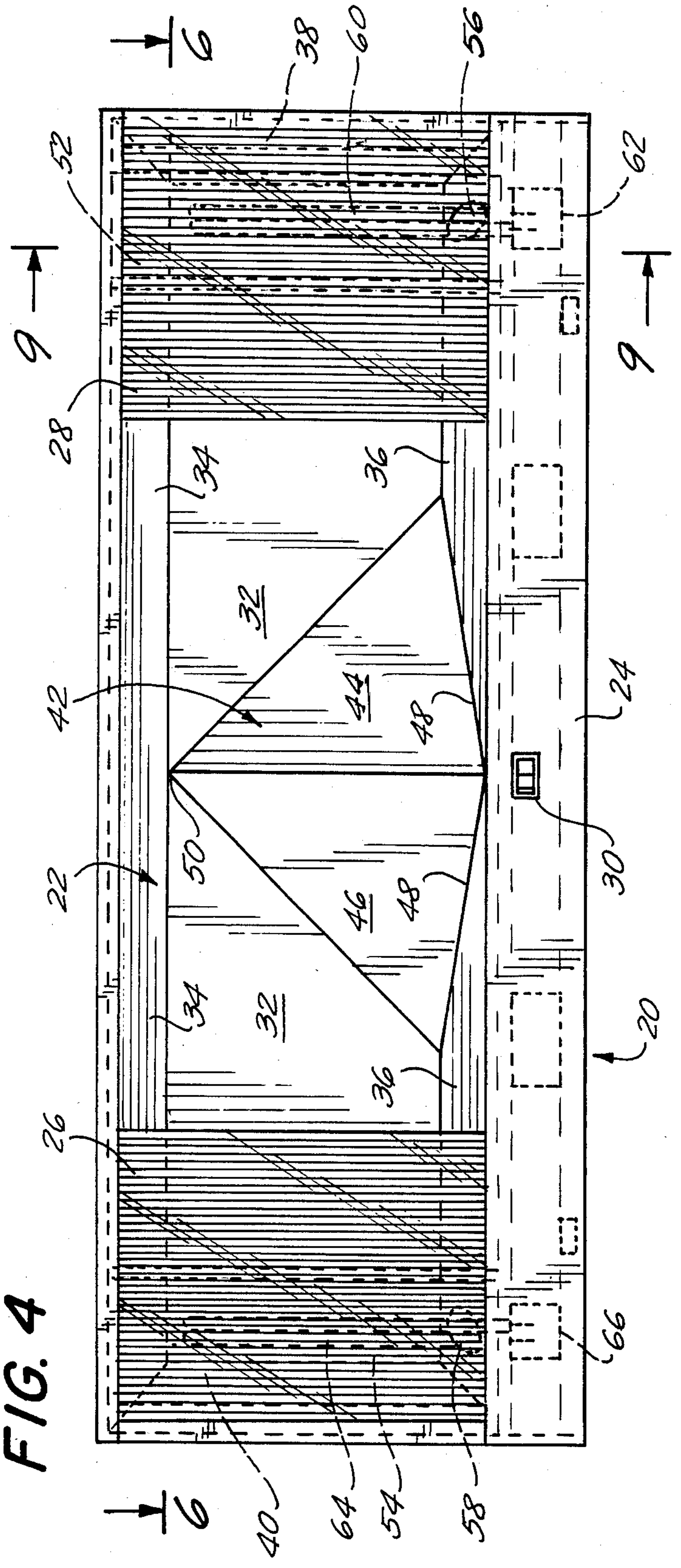
FIG. 4 is a bottom plan view of a lamp according to the present invention.

FIG. 4 shows a light bulb 60 extending from a socket 62 through hole 56 into the interior of reflector assembly 22 and a light bulb 64 extending from a socket 66 through hole 58 into the interior of reflector assembly 22. Preferably, light bulbs 60, 64 are PL type fluorescent lamps. A portion of the light from each light bulb is reflected by its associated shield-reflector toward its associated side reflecting surface and then toward the pyramidal reflecting piece in the middle of the reflector assembly. The pyramidal reflecting piece reflects light toward the front of the worksurface.

Figure 7:
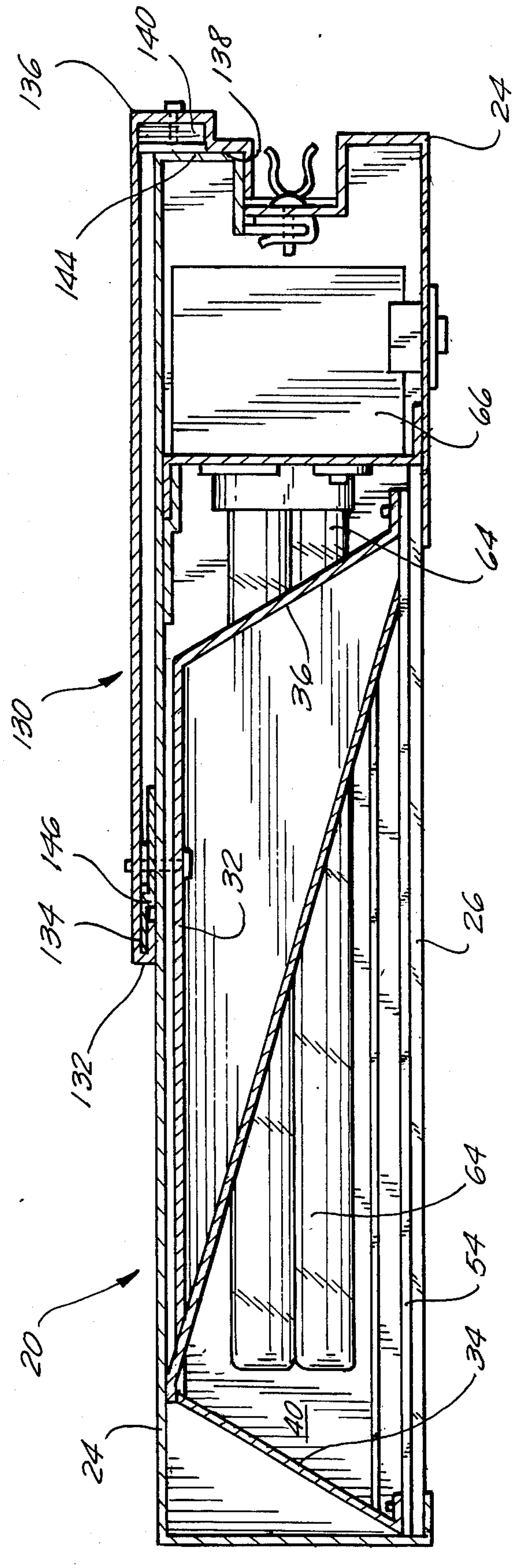
FIG. 7 is a sectional view of a lamp according to the present invention taken along line 7—7 of FIG. 6.
Figure 10:
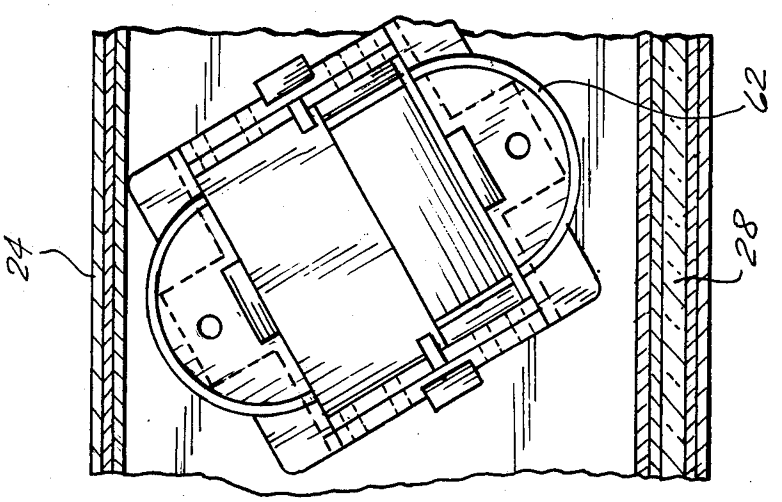
FIG. 10 is an enlarged, fragmentary sectional view of a lamp according to the present invention taken along line 10—10 of FIG. 9 and depicts a socket for a lamp according to the present invention.
Figure 9:
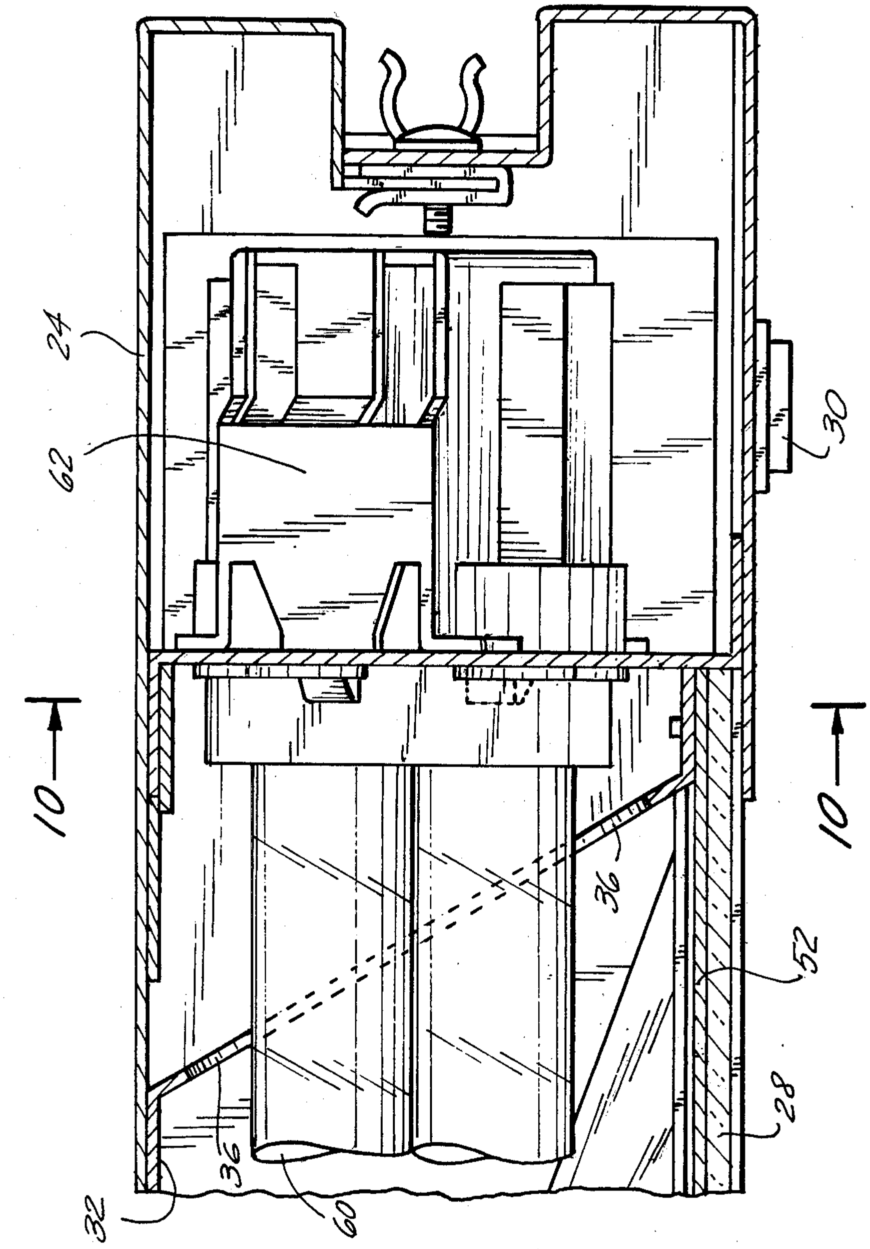
FIG. 9 is an enlarged, fragmentary sectional view of a lamp according to the present invention taken along line 9—9 of FIG. 4.

FIG. 7 is an enlarged view of light bulb 64 and socket 66, while FIGS. 9 and 10 more clearly illustrate socket 62. The socket depicted in FIGS. 9 and 10 receives a PL type fluorescent lamp.

PL type fluorescent lamps are of known construction and have a generally oval outline with a major axis that runs between the ends of the oval. As seen in FIG. 10 socket 62 is arranged to position the major axis of the oval outline of light bulb 60 substantially parallel to side reflecting surface 38. That is, socket 62 is tilted to form the same angle that side reflecting surface 38 forms with respect to a vertical plane when lamp 20 is in its normal operating position. Similarly, socket 66 is arranged to position the major axis of the oval outline of light bulb 64 substantially parallel to side reflecting surface 40.

Figure 8:
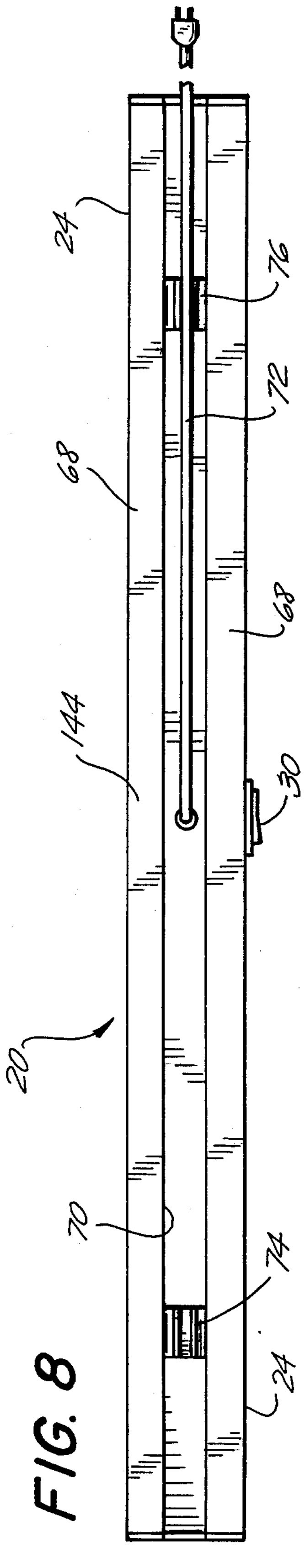
FIG. 8 is a rear elevational view of a lamp according to the present invention.

The back side 68 of housing 24 is shown in FIG. 8. As seen therein, channel 70 is formed in back side 68 and is sized to accept an electrical power cord 72 which is used to provide electricity for sockets 62 and 66. Cord 72 may be routed to the left or to the right, depending upon convenience, through channel 70 to an electrical power outlet. Therefore, lamp 20 may be installed with back side 68 flush with the back wall of the workstation, if desired. Clips 74 and 76 are mounted in channel 70, and cord 72 may be inserted into and held by one of the clips 74, 76.

Figure 5:
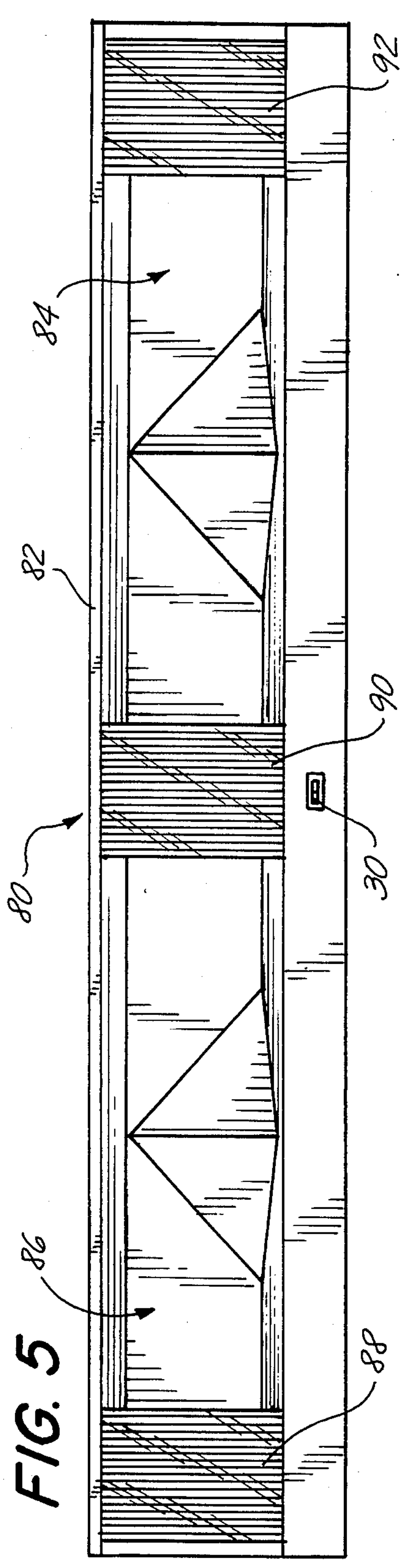
FIG. 5 is a bottom plan view of another lamp according to the present invention and illustrates an embodiment wherein two pyramidal reflecting pieces are employed.

FIG. 5 illustrates a lamp 80 according to another embodiment of the invention. As seen therein, lamp 80 has a housing 82 and reflector assemblies 84 and 86. Each reflector assembly includes a planar reflecting surface, a front reflecting surface, side reflecting surfaces, and a pyramidal reflecting piece with triangular reflecting surfaces, like reflector assembly 22 shown in FIGS. 1–4 and FIGS. 6–10. Again, the front, back, and side reflecting surfaces of each reflector assembly have predetermined angles with respect to a vertical plane when lamp 80 is in its normal operating position, i.e., when the planar reflecting surfaces of the reflector assemblies are parallel to a horizontal plane. Lamp 80 has lenses 88, 90, and 92, which are slidably mounted in housing 82. Lenses 88, 90, 92 may be moved to adjust the light level at the workstation. Housing 82 may be supplied in a variety of lengths in order to fit into a number of different installations, with reflector assemblies 84, 86 sized accordingly. Additionally, still longer housings having three or more reflector assemblies and a proportional number of lenses may be supplied.

Figure 11:
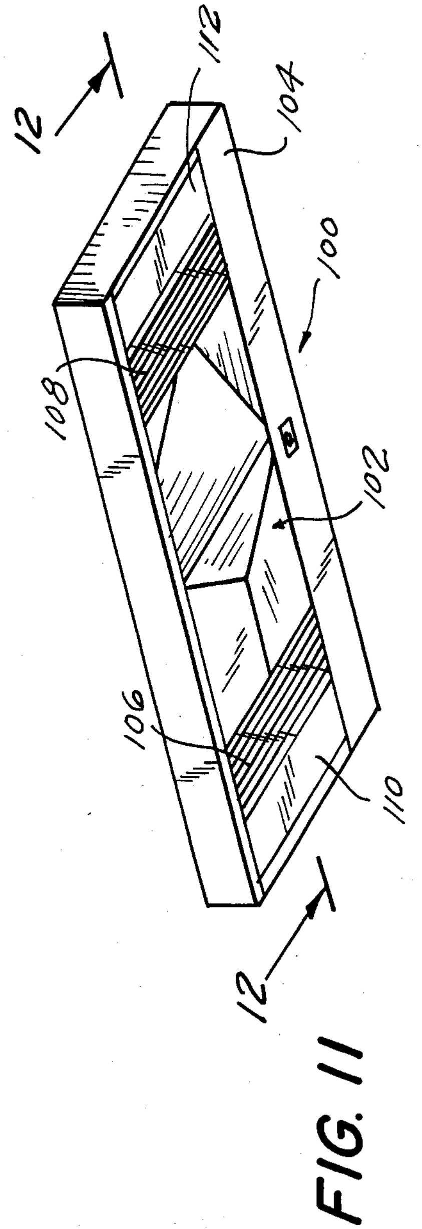
FIG. 11 is a perspective view of another embodiment of a lamp according to the present invention.
Figure 12:
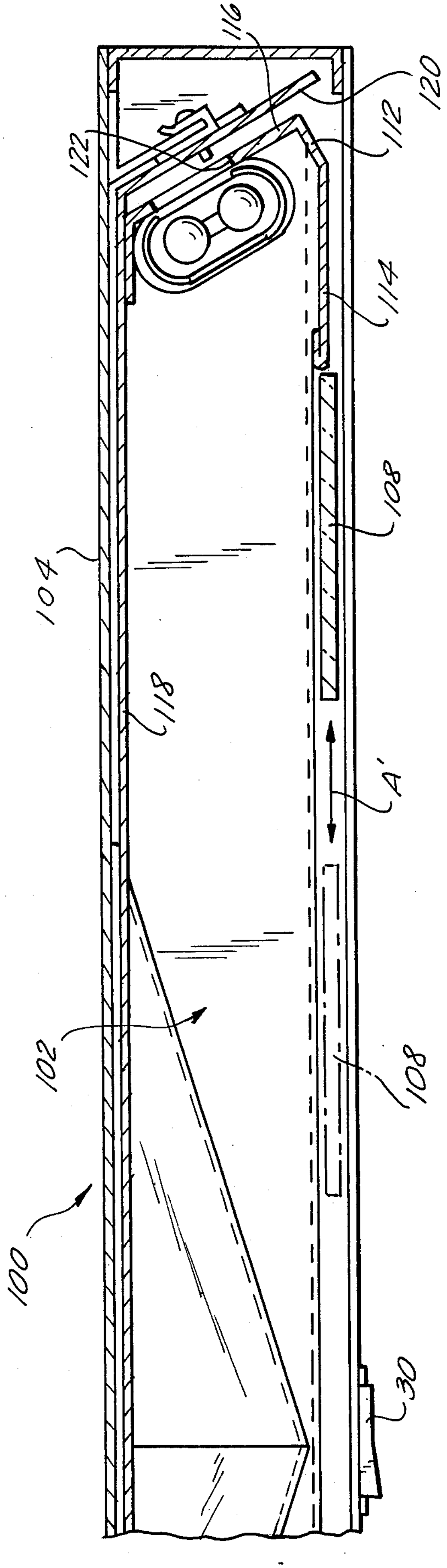
FIG. 12 is an enlarged, fragmentary sectional view of a lamp according to the present invention taken along line 12—12 of FIG. 11.

FIGS. 11 and 12 illustrate yet another lamp 100 according to the invention. Lamp 100 includes a reflector assembly 102, a housing 104, lenses 106 and 108, and shield-reflectors 110 and 112. Lamp 100 is similar to lamp 20, depicted in FIGS. 1–4 and FIGS. 6–10. In fact, the reflector assemblies are the same. However, the shield-reflectors and the arrangement of the shield-reflectors with respect to the lenses are different. Since reflector assembly 102 is identical to reflector assembly 22, reflector assembly 102 will not be described in further detail.

Shield-reflectors 110, 112 are generally V shaped with one leg substantially parallel to the associated side reflecting surface and one leg substantially parallel to the planar reflecting surface. FIG. 12 shows shield-reflector 112 with legs 114 and 116. Leg 114 is parallel to planar reflecting surface 118, while leg 116 is parallel to side reflecting surface 120. As in the lamp illustrated in FIG. 6, the major axis of light bulb 122 is also parallel to side reflecting surface 120. Each shield-reflector 110, 112 has an aperture in the leg that is substantially parallel to the associated side reflecting surface. In FIG. 12, for instance, leg 116 has an aperture 122. The apertures enable light to pass through to the side reflecting surfaces and be reflected beyond the ends of the housing, thereby providing uniform illumination to the sides of the workstation.

Lens 106, 108 are slidably mounted in housing 104, as seen in FIG. 12 wherein the arrow A' illustrates the direction of movement of lens 108. The light level, therefore, may be adjusted to a suitable level for the specific job or the specific user. Lenses 106, 108 abut shield-reflectors 110, 112, respectively, at their outermost extremes of travel, i.e., when the lenses are located as far from the center as possible. A lens abuts the leg of the associated shield reflector that is parallel to the planar reflecting surface. By contrast, lenses 26, 28 of lamp 20 (FIGS. 1–4 and 6–10) are mounted to slide under shield-reflectors 54, 52, respectively, when lenses 26, 28 are at their outermost extremes of travel.

Shield-reflectors 52, 54 for the lamp 20 illustrated in FIGS. 1–4 and FIGS. 6–10 and shield-reflectors 110, 112 for the lamp 100 illustrated in FIGS. 11–12 may be finished in white, like the reflecting surfaces of the reflector assembly. Alternatively, the shield-reflectors may be specular reflectors.

Figure 13:
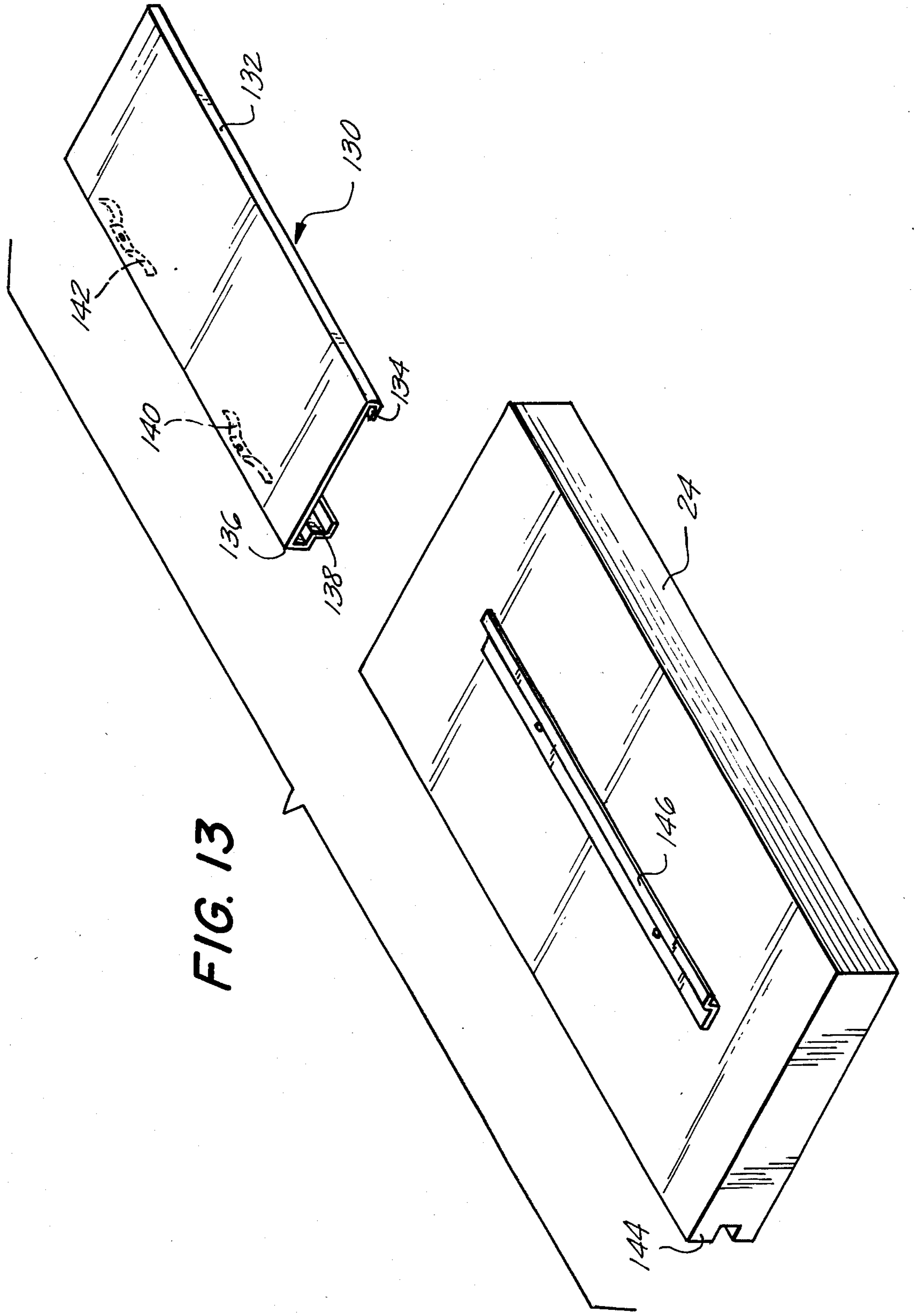
FIG. 13 is a perspective view of a mounting bracket and a housing for a lamp according to the present invention.

FIGS. 7 and 13 depict a mounting bracket 130 for a lamp according to the invention. Mounting bracket 130 has a front portion 132 that defines a groove 134 and a back portion 136 that defines a channel 138. Springs 140 and 142 are mounted in channel 138.

An example of how a lamp according to the invention is installed in mounting bracket 130 will now be described. For convenience, lamp 20 of FIGS. 1–4 and FIGS. 6–10 will be used in this example. Lamp 20 includes channel 70 along the back side of the housing, as FIG. 8 shows. Channel 70 defines a shoulder 144 of housing 24. Lamp 20 has a flange 146 secured on the top of the housing, as indicated in FIGS. 7 and 13. Flange 146 extends above the top of the housing. To install lamp 20 in mounting bracket 130, shoulder 144 is inserted by a user into channel 138, and shoulder 144 is pushed against springs 140, 142. Then, flange 146 is slipped into groove 134. Next, the housing is released by the user, and springs 140, 142 engage shoulder 144 and urge housing 24 toward front portion 132 of mounting bracket 130. The bottom of shoulder 144 rests against the bottom of channel 138, and housing 24 is held in position. This spring-loaded mounting configuration allows a lamp to be readily installed and removed.

Although particular illustrative embodiments of the present invention have been described herein with reference to the accompanying drawings, the present invention is not limited to these particular embodiments. Various changes and modifications may be made thereto by those skilled in the art without departing from the spirit or scope of the invention, which is defined by the appended claims.

We claim:

1. A lamp, comprising:

a reflector assembly having a planar reflecting surface, a front reflecting surface extending from the planar reflecting surface, a back reflecting surface extending from the planar reflecting surface, a first side reflecting surface running between the front and back reflecting surfaces and extending from the planar reflecting surface, a second side reflecting surface running between the front and back reflecting surfaces and extending from the planar reflecting surface, and a pyramidal reflecting piece extending from the planar reflecting surface, the pyramidal reflecting piece having a base positioned against one of the front and back reflecting surfaces and a vertex positioned proximate the other of the front and back reflecting surfaces, the front reflecting surface, the back reflecting surface, and the first and second side reflecting surfaces having predetermined angles with respect to a vertical plane when the lamp is in a normal operating position;

first socket means for receiving a first light bulb;

second socket means for receiving a second light bulb; and a housing;

wherein the reflector assembly, the first socket means, and the second socket means are mounted in the housing so that the pyramidal reflecting piece is located between the first socket means and the second socket means, the first socket means being mounted to position the first light bulb proximate the first side reflecting surface when the first light bulb is inserted in the first socket means, the second socket means being mounted to position the second light bulb proximate the second side reflecting surface when the second light bulb is inserted in the second socket means.

2. A lamp as defined in claim 1, further comprising:

a first lens slidably mounted in the housing; and a second lens slidably mounted in the housing;

wherein the first and second lenses are slidable into a plurality of positions along the reflector assembly, a distinct light level being associated with each position.

3. A lamp as defined in claim 1, wherein the predetermined angles of the front reflecting surface, the back reflecting surface, and the first and second side reflecting surfaces with respect to the vertical plane are all approximately 30 degrees.

4. A lamp as defined in claim 1, wherein the reflector assembly includes a first shield-reflector and a second shield-reflector; wherein the first shield-reflector is located proximate the first side reflecting surface so that when the first light bulb is inserted in the first socket means, the first light bulb is positioned between the planar reflecting surface and the first shield-reflector; and wherein the second shield-reflector is located proximate the second side reflecting surface so that when the second light bulb is inserted in the second socket means, the second light bulb is positioned between the planar reflecting surface and the second shield-reflector.

5. A lamp as defined in claim 4, wherein the first side reflecting surface and the first shield-reflector define a first slot, light from the first light bulb being able to pass through the first slot and illuminate an area beyond the side of the housing, and wherein the second side reflecting surface and the second shield-reflector define a second slot, light from the second light bulb being able to pass through the second slot and illuminate an area beyond the side of the housing.

6. A lamp as defined in claim 4, wherein the first shield-reflector is generally V shaped with a first leg and a second leg, the first leg of the first shield-reflector being substantially parallel to the first side reflecting surface, the first leg of the first shield-reflector having a first aperture, light from the first light bulb being able to pass through the first aperture and illuminate an area beyond the side of the housing, and wherein the second shield-reflector is generally V shaped with a first leg and a second leg, the first leg of the second shield-reflector being substantially parallel to the second side reflecting surface, the first leg of the second shield-reflector having a second aperture, light from the second light bulb being able to pass through the second aperture and illuminate an area beyond the side of the housing.

7. A lamp as defined in claim 6, wherein the first shield-reflector and the second shield-reflector are each specular reflectors.

8. A lamp as defined in claim 6, further comprising:

a first lens slidably mounted in the housing; and a second lens slidably mounted in the housing;

wherein the first lens abuts the second leg of the first shield-reflector at an extreme of travel and wherein the second lens abuts the second leg of the second shield-reflector at an opposite extreme of travel.

9. A lamp as defined in claim 1, wherein the planar reflecting surface, the front reflecting surface, the back reflecting surface, and the first and second side reflecting surfaces are each finished in white.

10. A lamp as defined in claim 1, wherein the first socket means includes means for receiving a first light bulb with a generally oval outline, the first socket means being arranged so that the major axis of the oval is substantially parallel to the first side reflecting surface when the first light bulb is inserted in the first socket means; and wherein the second socket means includes means for receiving a second light bulb with a generally oval outline, the second socket means being arranged so that the major axis of the oval is substantially parallel to the second side reflecting surface when the second light bulb is inserted in the second socket means.

11. A lamp as defined in claim 1, wherein the housing has a back side with a channel, the channel being sized to accept an electrical power cord for providing electricity to the first and second socket means.

12. A lamp as defined in claim 11, wherein at least one clip for the electrical power cord is mounted in the channel.

13. A lamp as defined in claim 1, wherein the pyramidal reflecting piece includes a plurality of triangular reflecting surfaces, the triangular reflecting surfaces extending from the planar reflecting surface.

14. A lamp as defined in claim 1, further comprising a mounting bracket with a front portion defining a groove, a back portion defining a channel, and at least one spring mounted in the channel; wherein the housing has a back side with a channel defining a shoulder; wherein the housing includes an extending flange; and wherein, when the housing is installed in the mounting bracket, the flange extends into the groove, the shoulder of the housing extends into the channel of the mounting bracket, and the spring engages the shoulder and urges the housing toward the front portion of the mounting bracket.

* * * * *